(12) United States Patent
Hu et al.

(10) Patent No.: US 8,798,327 B2
(45) Date of Patent: Aug. 5, 2014

(54) METHOD AND SYSTEM FOR PEOPLE FLOW STATISTICS

(75) Inventors: Zhigang Hu, Hangzhou (CN); Yong Zhu, Hangzhou (CN); Ye Ren, Hangzhou (CN); Weiwei Cai, Hangzhou (CN); Yonghua Jia, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 161 days.

(21) Appl. No.: 13/578,324

(22) PCT Filed: Feb. 10, 2010

(86) PCT No.: PCT/CN2010/070607
§ 371 (c)(1),
(2), (4) Date: Oct. 23, 2012

(87) PCT Pub. No.: WO2011/097795
PCT Pub. Date: Aug. 18, 2011

(65) Prior Publication Data
US 2013/0070969 A1 Mar. 21, 2013

(51) Int. Cl.
*G06K 9/00* (2006.01)
*H04W 4/00* (2009.01)

(52) U.S. Cl.
USPC ............................ 382/107; 382/291; 455/433

(58) Field of Classification Search
USPC ......... 382/100, 103, 106–107, 116, 154, 155, 382/162, 168, 173, 181, 209, 219, 224, 232, 382/254, 274, 276, 287–291, 305, 312; 455/446, 433
See application file for complete search history.

(56) References Cited

U.S. PATENT DOCUMENTS

| | | | | |
|---|---|---|---|---|
| 7,742,769 | B2 * | 6/2010 | Goodman | 455/446 |
| 8,213,679 | B2 * | 7/2012 | Yao | 382/103 |
| 8,295,545 | B2 * | 10/2012 | Hampapur et al. | 382/103 |
| 2008/0219517 | A1 * | 9/2008 | Blonk et al. | 382/118 |
| 2010/0124357 | A1 * | 5/2010 | Hampapur et al. | 382/103 |

FOREIGN PATENT DOCUMENTS

| | | |
|---|---|---|
| CN | 1471053 A | 1/2004 |
| CN | 101178773 A | 5/2008 |
| CN | 101464946 A | 6/2009 |
| CN | 101477641 A | 7/2009 |

OTHER PUBLICATIONS

PCT Examiner, Guo, Liang, PCT/CN2010/070607, International Search Report and Written Opinion mailed Nov. 25, 2010, 10 pages.

* cited by examiner

*Primary Examiner* — Seyed Azarian
(74) *Attorney, Agent, or Firm* — Fish & Richardson P.C.

(57) ABSTRACT

A method and system for people flow statistics is disclosed in the invention, wherein said method comprises: multi-types of classifiers connected in parallel are used to perform the human head detection in the current image, the respective human heads in the current image are determined; the respective determined human heads are tracked to form the human head target movement tracks; and the people flow is counted at the direction of the human head target movement track. It can be seen, a plurality of classifiers connected in parallel are used in the invention, multi-types of human head targets, such as dark colored hair, light colored hair and caps of various colors, and the like, can be detected simultaneously.

13 Claims, 4 Drawing Sheets

```
┌─────────────────────────────────────────────┐
│ Multi-types of classifiers connected in     │
│ parallel are used to perform the human head │  S101
│ detection in the current image, the         │
│ respective human heads in the current       │
│ image are determined                        │
└─────────────────────────────────────────────┘
                      │
                      ▼
┌─────────────────────────────────────────────┐
│ The respective determined human heads are   │  S102
│ tracked to form the human head target       │
│ movement tracks                             │
└─────────────────────────────────────────────┘
                      │
                      ▼
┌─────────────────────────────────────────────┐
│ The people flow is counted based on the     │  S103
│ direction of the human head target movement │
│ track                                       │
└─────────────────────────────────────────────┘
```

METHOD AND SYSTEM FOR PEOPLE FLOW STATISTICS

CROSS-REFERENCE TO RELATED APPLICATIONS

This application is a U.S. National Phase Application of International Patent Application No. PCT/CN2010/070607, filed Feb. 10, 2010, and entitled "METHOD AND SYSTEM FOR POPULATION FLOW STATISTICS," which is incorporated herein by reference.

TECHNICAL FIELD

The invention relates to a technical area for video monitoring and image processing and analyzing, particularly, relates to method and system for people flow statistics.

BACKGROUND ART

With the continuous social progress, the application range of the video monitoring system becomes increasingly wider. Surveillance cameras are installed usually at the entrances and exits of the places, such as the super markets, markets, stadiums, and airports, stations, and the like, to monitor the entrances and exits of these places by the security personnel and managers. On the other hand, the people flow at the entrances and exits of the places, such as the super markets, markets, stadiums, and airports, stations, and the like, is very important to the operators and managers of the above places, wherein, the people flow is the number of the people flowing to a certain direction, in the present document, it indicates specifically the number of the people flowing to the entry direction and exit direction both.

As to the prior video monitoring, the people flow statistics is primarily implemented by the monitoring personnel with manual inventory. Such method for counting manually the people flow is reliable under the condition that the monitoring time period is short and the people flow is sparse, however, because of the limitations of the biological characteristics of the human eye, under the condition that the monitoring time period is long and the people flow is dense, the accuracy of the statistics will be decreased significantly, and the manual statistics method will spend a lot of labor costs. Automatic inventory of the people flow can be realized by the people flow statistics method based on the video analyzing, and various problems produced by the manual statistics can be solved. Currently, there are mainly three types of flow statistics methods based on the video analyzing:

The first one is a method based on tracking the feature points, in said method, some moving feature points are tracked firstly, then the tracks of the feature points are made cluster analysis, thereby the people flow information can be obtained; in the method based on tracking the feature points, some moving feature points are required to be tracked, then the tracks of the feature points are made cluster analysis, thereby the people flow information can be obtained, the disadvantage of said method is that it is difficult to track stably the feature points themselves, so the counting accuracy is not very good.

The second one is a method based on human body segmentation and tracking, in said method, it is required to extract firstly a moving target block, then the moving target block is segmented to obtain single human body targets, and finally, the respective single human body targets are tracked to realize the people flow statistics; in the method based on the human body segmentation and tracking, the target blocks which are moving will be extracted firstly, then single human body targets can be obtained by segmenting the moving target block, at last, they are tracked to obtained the respective human body tracks, thereby the people flow statistics can be realized. The disadvantage of said method is that the accuracy of the human body segmentation cannot be ensured when the human body is shielded, and this affects the statistical accuracy.

The third one is a method based on detecting and tracking the human head or head and shoulder, in said method, human head or head and shoulder are detected from the video, and the people flow statistics is performed by tracking the human head or head and shoulder. The method based on detecting and tracking the human head detects the human heads from the video, the people flow statistics is performed by tracking the human heads, when the angle of the camera is suitable, there is less condition that the human heads are shielded, thereby the accuracy of the method based on detecting the human heads can be improved comparing with the above two methods, currently, the method for counting the number of people based on human head detection has been suggested by some companies, for example, in the method of the patent document of application number 200910076256.X, suggested by Vimicro, Beijing, firstly, a moving foreground is extracted, then two serial classifiers are trained by using haar characteristics, and the human heads with predetermined size are searched in the foreground to realize the human head detection, wherein the haar characteristic is a rectangle characteristic, the shape and gray level information of the target can be described by changing the size and the combination method of the rectangle. The classifiers used in said method only detect the targets of the same type, and they cannot detect different types of targets simultaneously, for example, they cannot detect the human head of dark colored hair (including wearing dark colored cap) and the human head of light colored hair (including wearing light colored cap) simultaneously, and it causes that the human head statistics is not comprehensive.

CONTENTS OF THE INVENTION

In view of this, method and system for people flow statistics are provided in the invention to solve the problem that the prior people flow statistics scheme is not comprehensive.

To this end, the following technical scheme can be used in the embodiments of the invention:

A method for people flow statistics, comprising: multi-types of classifiers connected in parallel are used to perform the human head detection in the current image, the respective human heads in the current image are determined; the respective determined human heads are tracked to form the human head target movement tracks; and the people flow is counted based on the direction of the human head target movement track.

After detecting the human heads of the current image by using the multi-types of classifiers connected in parallel, and before determining the respective human heads in the current image, it further comprises: fine screening the edge characteristics of the human heads detected by the multi-types of classifiers connected in parallel.

Said fine screening the edge characteristics of the human head detected by the multi-types of classifiers connected in parallel comprises: calculating the goodness of fit of the edge characteristics in the rectangle that the classifiers determine as a human head target and a preset first half of an elliptical arc (预置的上半椭圆弧), if the goodness of fit is larger than the threshold, then the rectangle will be defined as a human head, otherwise said rectangle will be deleted from the target list.

Before detecting the human head of the current image by using the multi-types of classifiers connected in parallel, it further comprises: scene calibration is performed in the detection area of the image thereby the detection area can be divided into several sub-areas; the human head detection by using the multi-types of classifiers connected in parallel is performed in said several sub-areas.

Said performing the scene calibration for the detection area in the image comprises: selecting a calibration box; calculating a scene depth variation coefficient; calculating the human head target size variation range in the detection area; and dividing the detection area into several sub-areas based on the human head target size variation range.

After forming the human head target movement track, and before counting the people flow based on the direction of the human head target movement track, it further comprises: analyzing the smoothness of the human head target movement track.

Said analyzing the smoothness of the human head target movement track comprises: determining the smoothness of the human head target movement track, deciding whether the smoothness satisfies the threshold or not, if it is, then the human head target movement track will be retained, otherwise, the human head target movement track will be discarded.

Said detecting the human heads in the image by using multi-types of classifiers connected in parallel comprises: setting the detection sequence for various types of classifiers, detecting the human heads of the current image in turn by using the respective classifiers based on the detection sequence until the human heads are determined, wherein said multi-types of classifiers are formed by at least two types of classifiers connected in parallel.

Said multi-types of classifiers connected in parallel are formed by any two types or multi-types of the dark colored hair universal classifiers, light colored hair classifiers, cap classifiers and extended classifiers connected in parallel.

A system for people flow statistics, it comprises: a human head detection module for detecting the human heads of the current image by using multi-types of classifiers connected in parallel to determine the respective human heads in the current image; a human head target tracking module for tracking the respective determined human heads and forming a human head target movement track; a people flow counting module for counting the people flow at the direction of the human head target movement track.

Said human head detection module further comprises a fine screening sub-module for fine screening the edge characteristics of the human heads detected by the multi-types of classifiers connected in parallel.

It further comprises: a scene calibration module for calibrating the scene of the detection area in the image thereby dividing the detection area into several sub-areas.

It further comprises: a human head target movement track analyzing module for calculating the smoothness of the human head target movement track, deciding whether the smoothness satisfies the threshold or not, if it is, then the human head target movement track will be retained, otherwise, the human head target movement track will be discarded.

Said human head detection module comprises a coarse detection sub-module for setting the detection sequence of the respective classifiers, and the detection of the human heads in the current image can be performed by using the respective classifiers based on the detection sequence until the human heads are determined, wherein said multi-types of classifiers connected in parallel are formed by at least two types of classifiers connected in parallel.

Said multi-types of classifiers connected in parallel in said human head detection module are formed by any two types or multi-types of the dark colored hair universal classifiers, light colored hair classifiers, cap classifiers and extended classifiers connected in parallel.

It can be seen, a plurality of classifiers connected in parallel are used in the invention, and a plurality of types of human head targets, such as dark colored hair, light colored hair and caps of various colors, and the like, can be detected simultaneously to ensure the statistics to be more comprehensive. Furthermore, an extended classifier is provided in the invention, based on the applications in special environment, it can collect the sample training, detect the human head having specified color or cap, for example, working cap for the factory or warehouse etc. Furthermore, on the basis of using a plurality of classifiers connected in parallel to perform the human head coarse detection, the coarse detection results are fine screened by using the edge characteristics, and at last, the real human head targets can be obtained thereby the detection will be more accurate. In addition, in the invention, the size of the detection window can be selected automatically by using the scene calibration before detecting, various camera angles can be adapted in the invention thereby the application range can be broadened. Furthermore, the mistaken targets can be deleted by analyzing the smoothness of the human head target track so that the detection accuracy can be further increased.

MODE OF CARRYING OUT THE INVENTION

Figure 1:
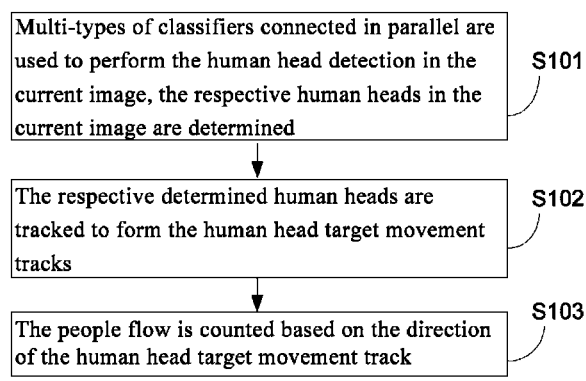
FIG. 1 is a flowchart of a method of people flow statistics in an embodiment of the invention.

In the prior scheme for determining the people flow based on the human head detection, single type of classifiers is used, such scheme will often cause undetected, for example, the human head having dark colored hair (including wearing dark colored cap) and the human head having light colored hair (including wearing light colored cap) can not be detected simultaneously, in order to solve the problem that the current detection is not comprehensive and not accurate, a method for people flow statistics is suggested in the invention, please refer to FIG. 1, it is a flowchart of an embodiment of the invention, it comprises:

S101: human heads are detected in the current image by using multi-types of classifiers connected in parallel to determine the respective human heads in the current image;

S102: the respective determined human heads are tracked to form a human head target movement track;

S103: the people flow is counted based on the direction of the human head target movement track.

Wherein the specific procedure for detecting the human heads in the image by using multi-types of classifiers connected in parallel is: setting the detection sequence for various types of classifiers, detecting the human heads of the current image by using the respective classifiers in turn according to the detection sequence until the human heads are determined, wherein said multi-types of classifiers connected in parallel are formed by at least two types of classifiers connected in parallel, one example of the multi-types of classifiers connected in parallel is formed by any two types or multi-types of the dark colored hair universal classifiers, light colored hair universal classifiers, cap classifiers and extended classifiers connected in parallel.

It can be seen, for the human head detection of the invention, multi-types of classifiers connected in parallel are used for detecting the respective human heads thereby the detection range can be broadened, and the accuracy of the people flow statistics can be improved.

Figure 2:
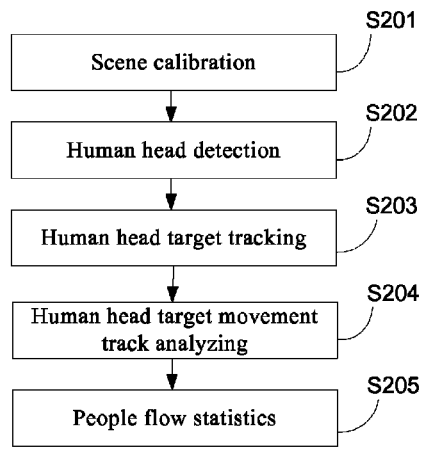
FIG. 2 is a flowchart of a method of people flow statistics in another embodiment of the invention.

In order to further improve the accuracy of the people flow statistics, it can be further optimized on the basis of the scheme as shown in FIG. 1, it comprises: calibrating the scene, fine screening the edge characteristics of the human heads that are performed coarse detection by the classifiers connected in parallel, and analyzing the smoothness of the human head target movement track, and the like, please refer to FIG. 2, it is a flowchart of another embodiment of the invention, it comprises:

S201: scene calibration;

specifically, for the scene calibration, it refers to calibrate the scene in the detection area of the image thereby the detection area can be divided into several sub-areas.

S202: human head detection;

the human head detection further comprises two steps of the coarse detection by the classifiers connected in parallel and the fine screening of the edge characteristics thereby the respective human heads in the current image can be determined.

S203: human head target tracking;

by tracking the respective determined human heads, the human head target movement track can be formed.

S204: smoothness analysis of the human head target movement track;

specifically, analyzing the smoothness of the human head target movement track comprises: determining the smoothness of the human head target movement track, deciding whether the smoothness satisfies the threshold or not, if it is, then the human head target movement track will be retained, otherwise, the human head target movement track will be discarded.

S205: people flow statistics: counting the people flow based on the direction of the human head target movement track.

It should be explained, the improvements, such as the above scene calibration, fine screening the edge characteristics of the human heads (which are coarsely detected by the classifiers connected in parallel), and analyzing the human head target movement track, can be applied in combination, or can be used individually.

The optimal embodiments of the invention comprising all of the improvements will be described in detail as follows.

1. Scene Calibration

Because the camera used for people flow statistics is normally installed fixedly, so the change of the scene is small, therefore the scene calibration module is only required to be enabled before the first frame detection of the human head target, and the result calibrated in the first frame can be used for detecting the human heads of the respective frames afterwards. If the scene changes, then the scene calibration will be enabled again.

Under the condition that the camera does not rotate, the depth change of the scene approximates a linear change along the y coordinate of the image, that is:

$$w(x,y)=f \times y+c \quad (1)$$

Wherein $w(x,y)$ indicates the width of a bounding rectangle of the human head target having the center image coordinate of $(x,y)$, f is a scene depth coefficient, and C is a constant. The object of the scene calibration is to determine the values f and C by using a calibration box thereby the size of the bounding rectangle of the human head target at any coordinate in the image can be solved by formula (1).

In the invention, two unknown quantities f and C in formula (1) can be calculated by selecting 4-6 calibration boxes thereby the scene depth variation coefficient can be obtained, then the upper edge and the bottom edge coordinates of the bounding rectangle in the detection area can be substituted into the formula (1) to obtain the minimum human head size $w_{min}$ and the maximum human head size $w_{max}$ in the detection area, finally, the detection area can be divided into several sub-areas based on the human head size variation range, each sub-area corresponds to a human head size range having small variation, in the following human head detection module, the windows having different sizes are used to search the candidate rectangle in each sub-area.

Figure 3:
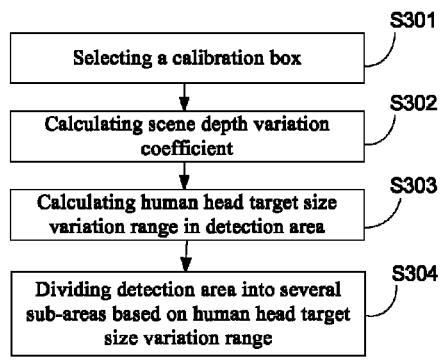
FIG. 3 is a flowchart of scene calibration in a preferred embodiment of the invention.

The block diagram of the scene calibration steps is shown in FIG. 3, it comprises:

S301: selecting a calibration box;

S302: calculating a scene depth variation coefficient;

S303: calculating human head target size variation range in the detection area;

S304: dividing the detection area into several sub-areas based on the human head target size variation range.

At this point, the scene calibration is ended. Next, detecting, tracking, and counting the human heads in each frame of the image will be started.

2. Human Head Detection

In the invention, the human head detection is divided into two links: coarse detection by the classifiers connected in parallel and fine screening of the edge characteristics.

In the link of the coarse detection by the classifiers connected in parallel, most of the non-human head areas are discarded by the pre-trained classifiers, and the human head targets and a part of mistaken detection areas are retained, then most of the mistaken detection areas are discarded by the edge characteristics fine screening link, and the real human head targets are retained. The block diagram of the human head detection module is shown in FIG. 4.

Figure 4:
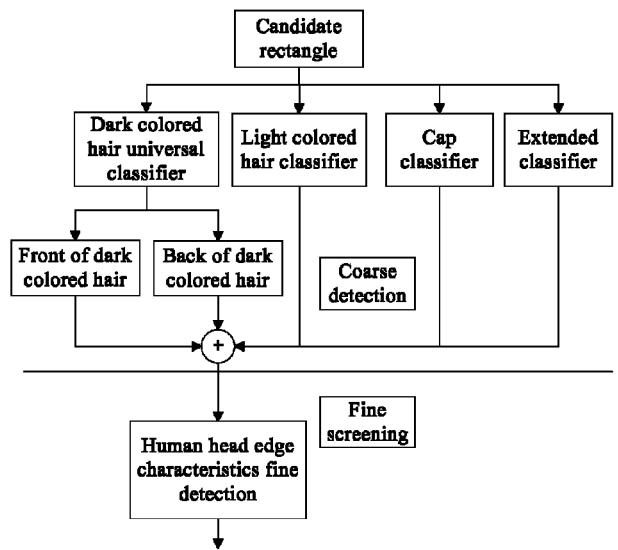
FIG. 4 is a structure block diagram of a human head detection module in a preferred embodiment of the invention.

In the invention, a plurality of classifiers, including the dark colored hair universal classifiers for the front of the human head and the back of the human head, dark colored hair front branch classifier, dark colored hair back branch classifier, light colored hair classifier, cap classifier and extended classifier, which is provided specifically to adapt specific environment, and the like, are trained respectively by using haar characteristics based on Adaboost algorithm The combination method of a plurality of classifiers of the coarse detection link is shown in FIG. 4: a tree structure is formed by combining the dark colored hair universal classifier, and front branch classifier, back branch classifier, and then it is connected in parallel with the light colored hair classifier, cap classifier and extended classifier, the result detected by the classifiers enters the human head edge fine screening link, and finally, real human head targets can be obtained.

2.1. Coarse Detection Link of Classifiers Connected in Parallel

A plenty of positive samples and negative samples are used to train the classifiers in advance, haar characteristics adding Adaboost algorithm, which are used in the human face detection, are used in the invention to train the identifiers.

Haar characteristics are formed by two or three rectangles having different sizes. The shape and gray level information of a specific target can be described by changing the sizes, combination method, and angles of the rectangles. Adaboost algorithm is a method, which can combine several weak classifiers to be a strong classifier. One or several haar characteristics can be selected by each weak classifier to classify the samples, several weak classifiers can be combined to be one strong classifier by Adaboost algorithm. In the invention, the respective types of classifiers are formed by cascading several strong classifiers.

In the invention, a human head target candidate rectangle is searched in the detection area by using an exhaustive method (穷举的方式) based on the human head target size obtained by the scene calibration module. The candidate rectangles to be classified are inputted respectively to the dark colored hair universal classifier, light colored hair classifier, cap classifier and extended classifier, if it is classified as a human head, then said candidate rectangle will be detected as a human head target and output, and the next candidate rectangle will be decided continuously, otherwise, the candidate rectangle will be discarded, and the next candidate rectangle will be decided continuously.

Figure 5:
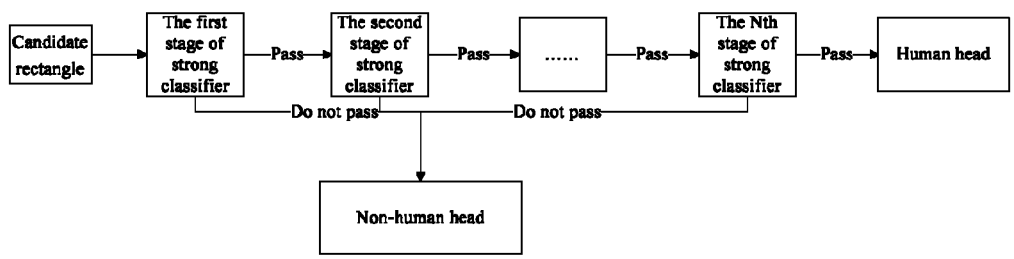
FIG. 5 is a schematic diagram of a cascade/classification process of the respective types of classifiers in a preferred embodiment of the invention.

In the above procedure, the candidate rectangle classified as a human head target should pass through the respective strong classifiers of the cascaded classifiers one by one, otherwise, it will be classified as a non-human head target, the schematic diagram of the procedure is shown in FIG. 5.

In addition, in the above classifier detection procedure, the preferably selected classifier can be adjusted based on the practical application. In the normal application scene, the probability of the dark colored hair is the maximum, therefore, detecting by the dark colored hair classifier is selected preferably, in a specific scene, for example, detecting the entrance of the warehouse, an extended classifier detection obtained by the working cap sample training can be selected preferably, so that the detection speed can be accelerated.

2.2 Edge Characteristics Fine Screening Link

Through the link of the coarse detection by the classifiers connected in parallel, most of the non-human head rectangles are discarded, and only the real human head rectangles and the rectangles, which are detected mistakenly by the classifiers as human head rectangles, are retained. Most of the rectangles detected mistakenly are discarded in the edge characteristics fine screening link by extracting the edge characteristics in the rectangles, and the real human head targets are retained.

The first half arc of the ellipse is used as the human head model in the invention, said edge characteristics fine screening calculates the goodness of fit of the edge characteristics in the rectangle (which is decided by the classifier as the human head target) and the first half elliptical arc, if the goodness of fit is larger than the decision threshold, then said rectangle will be a real human head rectangle, otherwise, it will be a human head rectangle detected mistakenly, and this rectangle will be deleted from the target list.

3. Human Head Tracking

It is required to track the detected human head targets to form a target movement track, and to avoid counting the same target repeatedly. A particle filtering algorithm is used in the target tracking module of the invention to track the human head targets.

Figure 6:
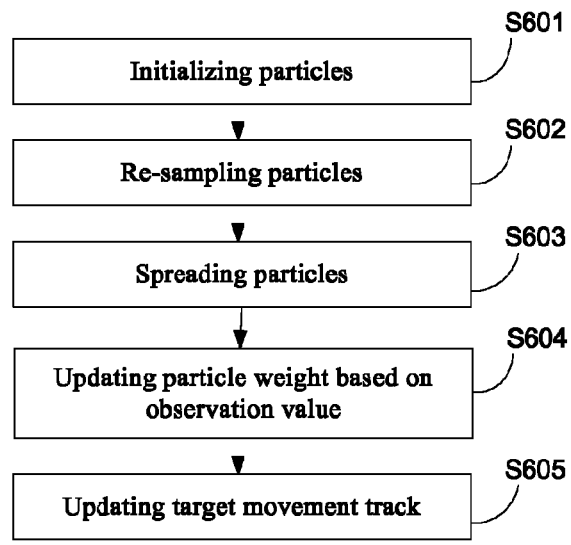
FIG. 6 is a particle filtering and tracking flowchart of a preferred embodiment of the invention.

The flowchart of the particle filtering tracking is shown in FIG. 6, the specific procedure is as follows:

Step 601: initializing the particles;

A particle tracker will be produced newly when the newly detected human head target does not correspond to a prior particle, and the positions and sizes of the respective particles in the tracker are initialized by using the newly detected target, and an identical weight value will be assigned to the respective particles.

Step 602: Re-sampling the particles;

In the tracking procedure, after updating the weight for several times, the particles will appear "degradation phenomenon", that is, the weight of few particles, which are close to the real human head rectangle, will become larger, while the weight of most of the particles, which are far from the human head rectangle, will become smaller, and a plenty of calculation of these particles having small weight is a waste. In order to solve the "degradation phenomenon", the particles must be re-sampled each time after the weight of the particle being updated.

Re-sampling the particles retains and copies the particles having large weight and removes the particles having small weight, and the weighted particles are mapped to the particles having identical weight to predetermine and track continuously. When the tracker is newly produced, the weights of the respective particles in the tracker are identical, therefore, the re-sampling is not required.

Step 603: Spreading the particles;

Spreading the particles, that is, transferring the states of the particles, refers to a procedure that the states of the particles are updated with the time. In the invention, the state of the particle refers to the position and size of the target rectangle represented by the particle. A random moving procedure is used to implement the spread of the particle, that is, the current state of the particle can be obtained by the previous state adding a random quantity. In this way, each current particle represents a possible position and size of the human head target in the current frame.

Step 604: Updating the particle weight based on the observation value;

Through transferring the particles, only the possible positions and sizes of the human head targets in the current frame can be obtained, however, which particles are the most possible human head rectangles will be determined by utilizing the observation values in the current frame. In the invention, the haar characteristics and edge characteristics of the image rectangles corresponding to the particles are extracted as the observation values to update the weight of the particles. The closer the observation value and the real human head are, the more possibly the rectangle corresponding to said particle is a human head rectangle, and the weight of the particle increases; otherwise, the weight of the particle decreases.

Step 605: Updating the target movement track;

Ordering the particles according to the weight values, extracting the particle having the largest weight, calculating an overlapping area between the rectangle corresponding to the particle having the largest weight and the rectangles of all of the human head targets obtained by detecting, the human head target having the largest overlapping area, which is larger than a set threshold is a human head in the current frame, which corresponds to the human head target represented by the tracker where the particle being placed, then the target movement track of the tracker is updated by using the position of this human head target, and the particle having the largest weight is substituted by said human head target to enter the tracking of the next frame; if the particle having the largest weight and all of the detected human head targets in the current frame are not overlapped or the overlapped area is smaller than the threshold, then it will be considered that for the human head target represented by the tracker where the particle being placed, the corresponding human head is not found in the current frame, then the target movement track of the tracker will be updated by the position of said particle to enter the tracking of the next frame. If the corresponding human head target is not found successively for the particle having the largest weight for N times (N>2), then it will indicate that the human head target represented by the tracker where the particle being placed disappears, and the tracker will be removed.

By going through the above five steps, the human head targets among the frames are associated to form a movement track of the human head targets.

4. Track Smoothness Analyzing Module

Normally, the movement of the real human head target is smooth, while the targets detected mistakenly maybe show a messy movement, thus, the mistaken detection can be removed by analyzing the smoothness of the target movement track in the invention, thereby the detection accuracy can be further improved.

Figure 7:
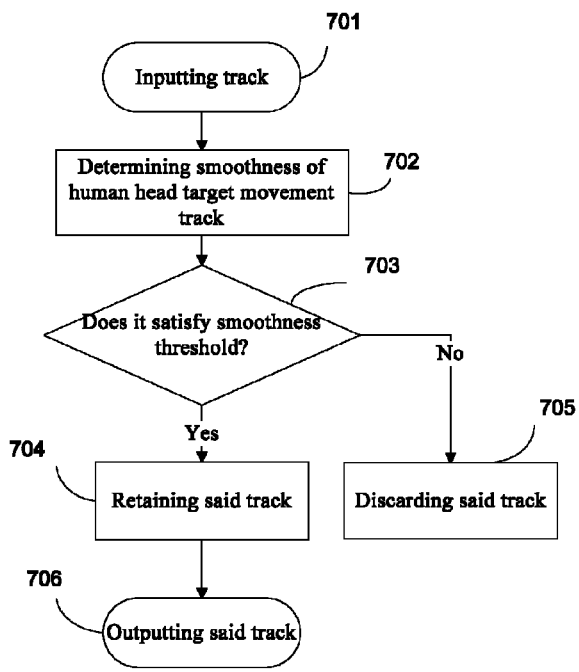
FIG. 7 is a flowchart of the movement track smoothness analysis in a preferred embodiment of the invention.

The target movement track produced by the tracking module is analyzed, and the smoothness coefficient of the target track is calculated, if the smoothness coefficient is larger than a set smoothness threshold, then said track will be retained; otherwise, said track will be removed. The flowchart of the track smoothness analyzing module is shown in FIG. 7, it comprises:

S701: obtaining the target movement track;
S702: determining the smoothness of the human head target movement track;
S703: deciding whether the smoothness satisfies a preset smoothness threshold requirement or not, if it is, then S704 will be executed, otherwise, S705 will be executed;
S704: retaining said target movement track;
S705: discarding said target movement track;
S706: outputting said target movement track.

5. People Flow Counting Module

The people flow is counted in the invention through the direction of the human head target movement track. Whether the direction of said target track in the detection area conforms to the direction set for "the people flow entering" or not is decided in the invention, if it conforms to, then the count of "the number of the people entering" will add one, otherwise, the count of "the number of the people departing" will add one. After completing the count, said target is marked as "counted" to make the track at an inactive state so that it is avoided counting the same target repeatedly.

At this point, the comprehensive and accurate statistics of the people flow has been completed by five steps of the scene calibration, human head detection, human head target tracking, human head target movement track analyzing and people flow counting.

Corresponding to the above method, a system for counting the people flow is further provided in the invention, said system can be implemented by software, hardware, or the combination of software and hardware.

Figure 8:
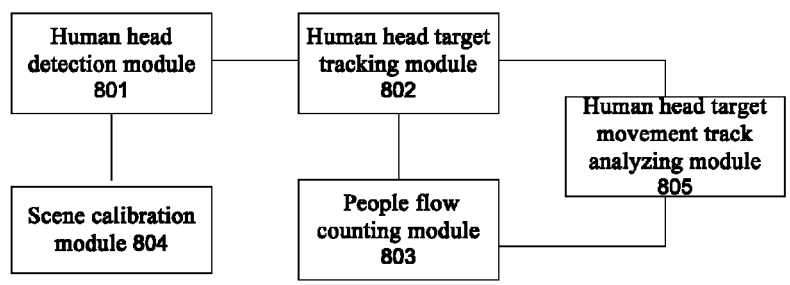
FIG. 8 is a schematic system structure diagram of the people flow statistics in the invention.

Referring to FIG. 8, said system comprises:

a human head detection module 801 for detecting the human head of the current image by using multi-types of classifiers connected in parallel to determine the respective human heads in the current image;

a human head target tracking module 802 for tracking the respective human heads determined by the human head detection module 801 to form the human head target movement track;

a people flow counting module 803 for counting the people flow at the direction of the human head target movement track determined by the human head target tracking module 802.

Wherein, the human head detection module 801 comprises a coarse detection sub-module for setting the detection sequence of the respective types of classifiers, the human head detection in the current image is performed by using the respective classifiers in turn based on the detection sequence until the human head is determined, wherein said multi-types of classifiers connected in parallel are formed by at least two types of classifiers connected in parallel. Said multi-types of classifiers connected in parallel in the human head detection module 801 are formed by any two types or multi-types of the dark colored hair universal classifiers, light colored hair classifiers, cap classifiers and extended classifiers connected in parallel. Preferably, said human head detection module 801 further comprises a fine screening sub-module for fine screening the edge characteristics of the human heads detected by the multi-types of classifiers connected in parallel.

Preferably, said system further comprises:

a scene calibration module 804 for scene calibrating the detection area in the image thereby the detection area can be divided into several sub-areas. Wherein the object of the scene calibration module 804 is to obtain a depth coefficient of the scene, and the size of the human head target of the respective positions in the image can be calculated based on the scene depth coefficient so that the detection sizes can be provided to the human head target detection module. At this time, the human head targets can be searched in several specified sub-areas by the human head detection module 801 based on the sizes provided by the scene calibration module 804.

Preferably, said system further comprises:

a human head target movement track analyzing module 805 for calculating the smoothness of the human head target movement track, deciding whether the smoothness satisfies the threshold or not, if it is, then said human head target movement track will be retained, otherwise, said human head target movement track will be discarded. At this time, the human heads at the direction of the movement track are counted by the people flow counting module 803 based on the human head target movement track analyzing module 805.

Please refer to the method embodiment for the specific implementation of the above system, and it will not repeat herein.

It can be seen, in the invention, a plurality of classifiers connected in parallel are trained by using haar characteristics based on Adaboost algorithm to perform the human head coarse detection, the coarse detection results are fine screened by using the edge characteristics, and at last, the real human head targets can be obtained. A plurality of classifiers connected in parallel are used in the invention, and several types of the human head targets, such as the dark colored hair, light colored hair, and caps of various colors, and the like, can be detected simultaneously, an extended classifier is also provided in the invention, based on the applications in special environment, it can collect the sample training, detect the human head having specified color or cap, for example, working cap for the factory or warehouse etc. In addition, in the invention, the size of the detection window can be selected automatically by using the scene calibration before detecting, various camera angles can be adapted in the invention thereby the application range can be broadened. Furthermore, the mistaken targets can be deleted by analyzing the smoothness of the human head target track so that the detection accuracy can be further increased.

The above description is only the preferred embodiments of the invention, it should be noted, for those skilled in the ordinary technology of the art, several improvements and retouches can be made without departing the principle of the invention, it is considered that these improvements and retouches fall within the protection scope of the invention.

What is claimed is:

1. A method for people flow statistics, comprising:
    performing scene calibration on a current image, wherein performing the scene calibration comprises:
    selecting a calibration box;
    calculating a scene depth variation coefficient;
    calculating a human head target size variation range in a detection area; and
    dividing the detection area into a plurality of sub-areas based on the human head target size variation range;
    multi-types of classifiers connected in parallel are used to perform human head detection in the current image, wherein respective human heads in the current image are determined;
    the respective determined human heads are tracked to form the human head target movement tracks; and
    the people flow is counted based on the direction of the human head target movement track,
    wherein the method is performed by a processor.

2. The method of claim 1, wherein after detecting the human heads of the current image by using the multi-types of classifiers connected in parallel, and before determining the respective human heads in the current image, it further comprises:
    fine screening the edge characteristics of the human heads detected by the multi-types of classifiers connected in parallel.

3. The method of claim 2, wherein said fine screen processing the edge characteristics of the human head detected by the multi-types of classifiers connected in parallel comprises:
    calculating the goodness of fit of the edge characteristics in the rectangle that the classifiers determine as a human head target and a preset first half of an elliptical arc, if the goodness of fit is larger than the threshold, then the rectangle will be defined as a human head, otherwise, said rectangle will be deleted from the target list.

4. The method of claim 1, wherein before detecting the human head of the current image by using the multi-types of classifiers connected in parallel, it further comprises:
    the human head detection by using the multi-types of classifiers connected in parallel is performed in said several sub-areas.

5. The method of claim 1, wherein after forming the human head target movement track, and before counting the people flow based on the direction of the human head target movement track, it further comprises:
    analyzing the smoothness of the human head target movement track.

6. The method of claim 5, wherein said analyzing the smoothness of the human head target movement track comprises:
    determining the smoothness of the human head target movement track, deciding whether the smoothness satisfies the threshold or not, if it is, then the human head target movement track will be retained, otherwise, the human head target movement track will be discarded.

7. The method of claim 1, wherein said detecting the human heads in the image by using multi-types of classifiers connected in parallel comprises:
    setting the detection sequence for various types of classifiers, detecting the human heads of the current image in turn by using the respective classifiers based on the detection sequence until the human heads are determined, wherein said multi-types of classifiers are formed by at least two types of classifiers connected in parallel.

8. The method of claim 1, wherein said multi-types of classifiers connected in parallel are formed by any two types or multi-types of the dark colored hair universal classifiers, light colored hair classifiers, cap classifiers and extended classifiers connected in parallel.

9. A system for people flow statistics, comprising:
    a scene calibration module for calibrating a scene of a current image configured to perform operations comprises:
    selecting a calibration box;
    calculating a scene depth variation coefficient;
    calculating a human head target size variation range in a detection area; and
    dividing the detection area into a plurality of sub-areas based on the human head target size variation range;
    a human head detection module for detecting the human heads of the current image by using multi-types of classifiers connected in parallel to determine the respective human heads in the current image;
    a human head target tracking module for tracking the respective determined human heads and forming a human head target movement track; and
    a people flow counting module for counting the people flow at the direction of the human head target movement track.

10. The system of claim 9, wherein said human head detection module further comprises a fine screening sub-module for fine screening the edge characteristics of the human heads detected by the multi-types of classifiers connected in parallel.

11. The system of claim 9, comprising:
    a human head target movement track analyzing module for calculating the smoothness of the human head target movement track, deciding whether the smoothness satisfies the threshold or not, if it is, then the human head target movement track will be retained, otherwise, the human head target movement track will be discarded.

12. The system of claim 9, wherein:
    said human head detection module comprises a coarse detection sub-module for setting the detection sequence of various types of classifiers, and the detection of the human heads in the current image can be performed by using the respective classifiers based on the detection sequence until the human heads are determined, wherein said multi-types of classifiers connected in parallel are formed by at least two types of classifiers connected in parallel.

13. The system of claim 9, wherein said multi-types of classifiers connected in parallel in said human head detection module are formed by any two types or multi-types of the dark colored hair universal classifiers, light colored hair classifiers, cap classifiers and extended classifiers connected in parallel.

* * * * *